United States Patent [19]

Sundeen

[11] 4,407,155

[45] Oct. 4, 1983

[54] ENGINE OPERATION RELATED EVENT TIMING SYSTEM

[75] Inventor: Arthur R. Sundeen, Lansing, Mich.

[73] Assignee: General Motors Corporation, Detroit, Mich.

[21] Appl. No.: 312,004

[22] Filed: Oct. 16, 1981

[51] Int. Cl.³ .......................................... G01M 15/00
[52] U.S. Cl. ...................................................... 73/116
[58] Field of Search ................. 73/116, 119 A, 117.3; 123/612, 614, 617; 324/391, 392

[56] References Cited

U.S. PATENT DOCUMENTS

| 2,072,984 | 3/1937 | Haskins . | |
|---|---|---|---|
| 3,454,871 | 7/1969 | Nolting . | |
| 3,589,177 | 6/1971 | Merlo . | |
| 4,043,189 | 8/1977 | Tedeschi | 73/117.3 |
| 4,052,663 | 10/1977 | Lindsey . | |
| 4,131,014 | 12/1978 | Scott | 73/119 A |
| 4,136,558 | 1/1979 | Lukes et al. | 73/119 A |
| 4,141,242 | 2/1979 | Scott | 73/117.3 |
| 4,331,029 | 5/1982 | Wilson | 324/391 X |

OTHER PUBLICATIONS

Merlo, A. L., Combustion Chamber . . . Resonances, from IEEE Transactions, Apr. 1970, vol. IECI-17, No. 2, pp. 60-66.
Lienesch, J. H. et al., Using Microwaves . . . Position, SAE Technical Paper 790103, Mar. 2, 1979, pp. 1-9.

Primary Examiner—Jerry W. Myracle
Attorney, Agent, or Firm—Mark A. Navarre

[57] ABSTRACT

A system for indicating the timing of an engine control event relative to the top dead center position of an internal combustion engine. A sensor responsive to piston movement develops pulses of equal angular width before and after the top dead center position of a selected piston, and the time relation of the sensor pulses with respect to the initiation of an engine control event is used to determine the timing of the engine control event with respect to the piston top dead center position. The timing so determined is compensated for engine acceleration by taking into account the difference in duration of the two sensor pulses.

8 Claims, 11 Drawing Figures

ENGINE OPERATION RELATED EVENT TIMING SYSTEM

This invention relates to a timing system for an internal combustion engine and more particularly to an apparatus for providing engine piston position information and for indicating the timing of an engine operation related event relative to a specified engine position.

In controlling the operation of an internal combustion engine, certain timing control functions must be performed with a high degree of accuracy to achieve optimum performance, economy, and emission control. In a gasoline engine, for example, spark timing is controlled, while in a diesel engine, fuel injection timing is controlled. In each case, the control function is initiated in timed relation to a specified engine position. Generally, the specified engine position is designated as the position for which a selected piston reaches the top dead center (TDC) position. According to common practice, the top dead center position is defined as the engine rotary position for which the selected piston is fully extended into its respective cylinder—that is, the top of its stroke. Alternatively, of course, a piston bottom dead center position may be chosen as the specified engine position, bottom dead center being defined as the engine position for which the selected piston reaches the bottom of its stroke.

It has been proposed to determine the top dead center position of an engine by detecting the movement of the selected piston as the engine is being cranked.

According to one technique, a testing instrument is inserted into the engine cylinder through a spark plug opening so that the piston contacts the instrument for a portion of its stroke. The period of contact then enables an operator or machine to determine the top dead center position since top dead center occurs midway between the commencement and termination of piston contacting.

According to another technique, a proximity detector is located in a manner to detect the periodic movement of a piston related member, developing a pulse centered about the top dead center position of the piston.

Another technique for determining the top dead center position is described in SAE Technical Paper 790103, Lienesch, Krage, entitled, "Using Microwaves to Phase Cylinder Pressure to Crankshaft Position". A cylinder of the engine is radiated with microwave energy and points of resonance before and after top dead center are detected. Such points of resonance correspond to equal cylinder volumes as the piston moves toward and away from top dead center, and are therefore symmetrically spaced about top dead center.

While such techniques may be useful for testing or calibration purposes, their sensitivity to engine acceleration renders them unsuitable for use in an onboard system wherein the top dead center position is continuously or periodically determined for control purposes.

Prior art onboard timing control systems generally reference the timing control with respect to fixed timing marks on a rotatable engine element. Such marks enable accurate engine timing control when the engine is new and properly calibrated, but control accuracy decreases with engine wear. As a result, the timing system must periodically be recalibrated to achieve accurate timing control.

Accordingly, it is a general object of this invention to provide an improved system for indicating the timing of an engine control event relative to the top or bottom dead center position of a selected piston wherein the timing indication is automatically compensated for engine wear.

It is a further object of this invention to provide an improved system of the above type wherein the timing indication is compensated for engine acceleration.

It is a further object of this invention to provide an improved system of the above type wherein the timing indication is unaffected by engine speed variations due to isolated engine combustion events.

These objects are carried forward by detecting the passage of a selected piston through a reference position while it is traveling toward and away from the dead center position, and by developing electrical timing signals that coincide with such passage. The initiation of the engine operation related event occurs during a time period defined by such timing signals and divides the time period into two intervals which are differenced to provide an indication of the timing of the engine operation related event with respect to the dead center position of the piston. The magnitude of such indication corresponds to the time duration between the event and the dead center position while the sign indicates whether the event is advanced or retarded with respect to the dead center position.

The engine acceleration compensation aspect of the invention is achieved by detecting the passage of the piston through two reference positions while it is traveling toward and away from the dead center position, and by developing electrical timing signals that coincide with such passage. Two time intervals defined by such timing signals and occurring on opposite sides of the dead center piston position are differenced to provide an indication of the engine acceleration, such indication being used to compensate the timing indication. The time difference which provides the acceleration indication must be exaggerated or magnified in relation to the time difference which provides the timing indication to take into account the angular relationships which define the time intervals. Specifically, the magnification factor is proportional to $S2/(S2-S1)$, where $S1$ and $S2$ are the distances in piston cycle degrees between the dead center position and the two reference piston positions, $S2$ being greater than $S1$.

The reference piston positions through which passage of the piston is detected are established by a sensor positioned along the piston travel path which sensor is responsive to the passage of a piston carried member. The location of the sensor is chosen so that the cyclic engine speed variations due to the isolated engine combustion engine events do not affect the timing and acceleration indications. Specifically, the sensor is located such that the distance between the reference positions and the piston dead center position is substantially an integral multiple of $180/N$ piston cycle degrees, where $N$ is the number of combustion events per piston cycle. In this way, the combustion event induced speed variations are the same when the piston passes the reference positions while traveling toward dead center as when the piston passes the reference positions while traveling away from dead center. As a result, the effects of such speed variations are substantially cancelled out when the various time intervals referred to above are differenced.

In a preferred embodiment, the time interval differences are determined by controlling the operation of a bidirectional counter mechanism according to the generation of the electrical timing signals. The counter mechanism is enabled to accumulate a count in opposite directions during the intervals to be differenced and the net count provides the compensated timing indication.

The term "acceleration" as used herein with respect to engine operation is meant to include negative acceleration or deceleration as well as positive acceleration.

IN THE DRAWINGS

Figure 1:
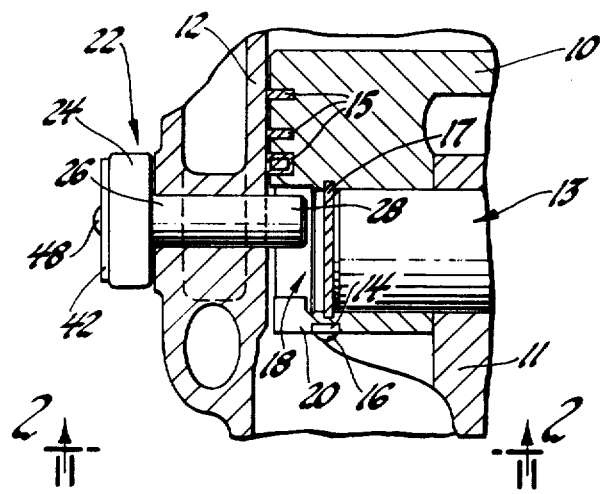
FIGS. 1 and 2 illustrate the selected piston and the piston position detecting mechanism.
Figure 2:
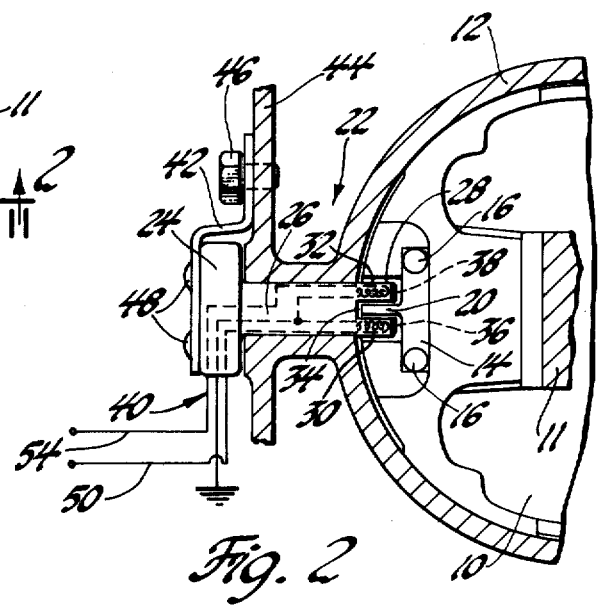

Referring now more particularly to FIGS. 1 and 2, there is shown a portion of a largely conventional internal combustion engine including piston 10, piston rings 15, cylinder 12, wrist pin 13, and wrist pin seal 17. Piston 10 is adapted to reciprocate within cylinder 12 and is connected to the engine crankshaft (not shown) via connecting arm 11 and wrist pin 13 in a conventional manner. In FIG. 1, piston 10 is shown in a position at or near bottom dead center.

A vane 14 of conductive material is rigidly connected by fasteners 16 to a portion 18 of piston 10 that is recessed relative to the cylinder contacting portion of piston 10. As indicated in FIGS. 1 and 2, such portion may be the recess conventionally provided for wrist pin 13. Vane 14 is positioned with respect to piston 10 so that its tip 20 extends radially outward from recess 18 but does not touch the inner wall of cylinder 12 as piston 10 reciprocates therein.

A sensor assembly designated generally by reference numeral 22 comprises a mounting flange 24, a stem 26, and a bifurcated tip 28. The tip 28 comprises two arms 30 and 32 separated by an air gap 34. Each arm houses an electrical winding 36, 38 as schematically illustrated in dashed lines in FIG. 2. Windings 36 and 38 are connected as indicated and the lead-in conductors designated generally by reference numeral 40 pass through sensor stem 26 and mounting flange 24 for connection to the pulse producing circuitry depicted in FIG. 3. Sensor mounting flange 24 is fastened via bracket 42 to an engine housing member 44 with bolt 46 as shown so that when piston 10 is reciprocated within cylinder 12, the vane 14 passes between sensor arms 30 and 32. Fasteners 48 secure sensor assembly 22 to bracket 42 to prevent sensor 22 from rotating within cylinder 12.

As will later be explained, winding 36 is energized with alternating current and the voltage across winding 38 is monitored as an indication of the magnetic coupling therebetween. When conductive vane 14 enters the air gap 34 according to the movement of piston 10, the magnetic coupling between windings 36 and 38 is significantly attenuated due to the inducement of Eddy currents in vane 14. Thus, the reciprocatory movement of piston 10 in cylinder 12 periodically alters the magnetic coupling between coils 36 and 38, such altered periods being detectable as will be explained in reference to FIGS. 3 and 4 by monitoring the induced voltage in winding 38.

Figure 3:
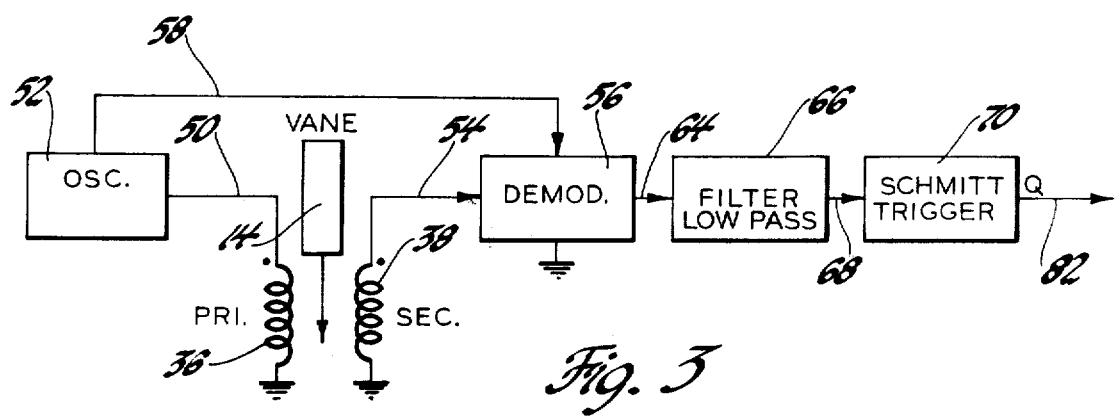
FIG. 3 illustrates the sensor pulse producing circuitry.
Figure 4:
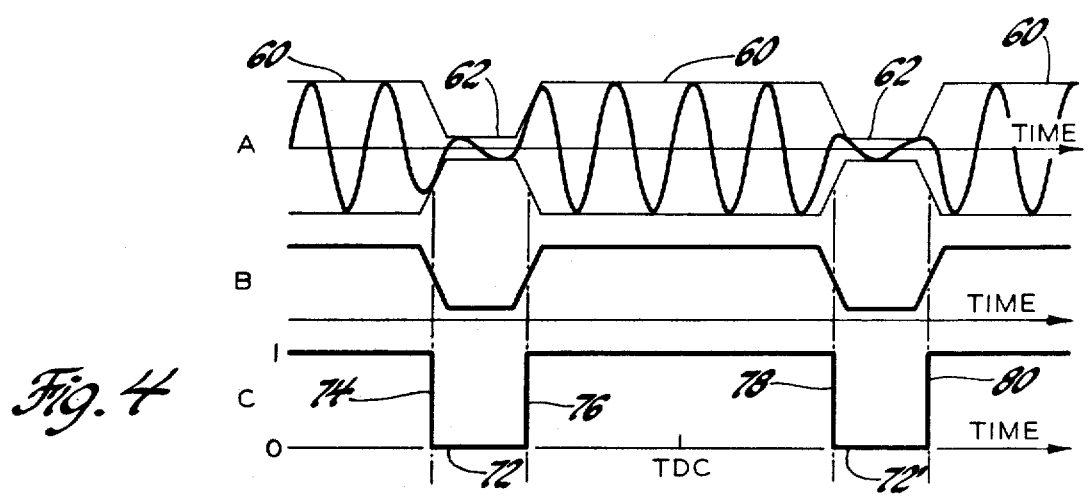
FIG. 4 is a graph depicting various idealized waveforms as a function of time for the circuit of FIG. 3.

Referring now more specifically to FIGS. 3 and 4, vane 14 and sensor windings 36 and 38 are shown schematically along with the appropriate circuitry for extracting piston position information therefrom. The undotted ends of windings 36 and 38 are connected to ground potential. The dotted end of winding 36 is connected via line 50 to square wave oscillator 52 which continuously energizes winding 36 with alternating current. The voltage thereby induced in winding 38 is applied as an input via line 54 to demodulator 56. The output of oscillator 52 is applied as a second input to demodulator 56 via line 58.

The induced voltage in winding 38 is depicted in graph A of FIG. 4 as a function of time. The periodic passing of vane 14 through air gap 34 produces alternate periods of altered and unaltered magnetic coupling. When vane 14 is not within air gap 34, the envelope voltage induced in winding 38 is at a relatively high level as designated by reference numerals 60. When vane 14 is within the air gap 34, the magnetic coupling is attenuated and the envelope voltage is at a low level as designated by reference numerals 62. Demodulator 56 detects the positive envelope voltage in a conventional manner and the output of demodulator 56 is depicted in graph B of FIG. 4 as a function of time. It will be understood that a variety of devices may be used to perform the function of demodulator 56 but that according to the preferred embodiment, a synchronous demodulator is used in order to achieve a high level of noise rejection.

The output of demodulator 56 is connected as an input via line 64 to low pass filter 66 which further rejects high frequency noise.

The output of filter 66 is connected as an input via line 68 to Schmitt trigger 70 which functions to shorten the rise times and fall times of the digital filter output, thereby developing a signal more suitable for use with digital logic circuitry. Schmitt trigger 70 thus produces a series of pulses 72 and 72' on output line 82, as depicted in graph C of FIG. 4. The reference numeral 72 designates pulses preceding top dead center (TDC) while reference numeral 72' designates pulses succeeding or following top dead center.

At constant average engine speed all sensor pulses 72 and 72' are of like time duration and their duration is inversely proportional to engine speed. In addition, the point designed TDC is the time bisector of pulses 72 and 72'. Under such conditions, this invention recognizes that the time difference between an interval from the occurrence of a pulse 72 to the initiation of an engine operation related event and an interval from the initiation of the event to the occurrence of a pulse 72' provides an indication of the timing of the event relative to top dead center.

It will be recognized, however, that under engine acceleration, the pulses 72 and 72' are unequal in time duration. Furthermore, top dead center (TDC) is not a time bisector of pulses 72 and 72'. Under such conditions, this invention recognizes that the difference in time duration between pulses 72 and 72' provides an indication of the acceleration of the engine, and that such indication may be used to compensate the above-mentioned timing indication for such acceleration so that the timing indication is accurate whether or not the engine is running at constant speed.

Figure 5:
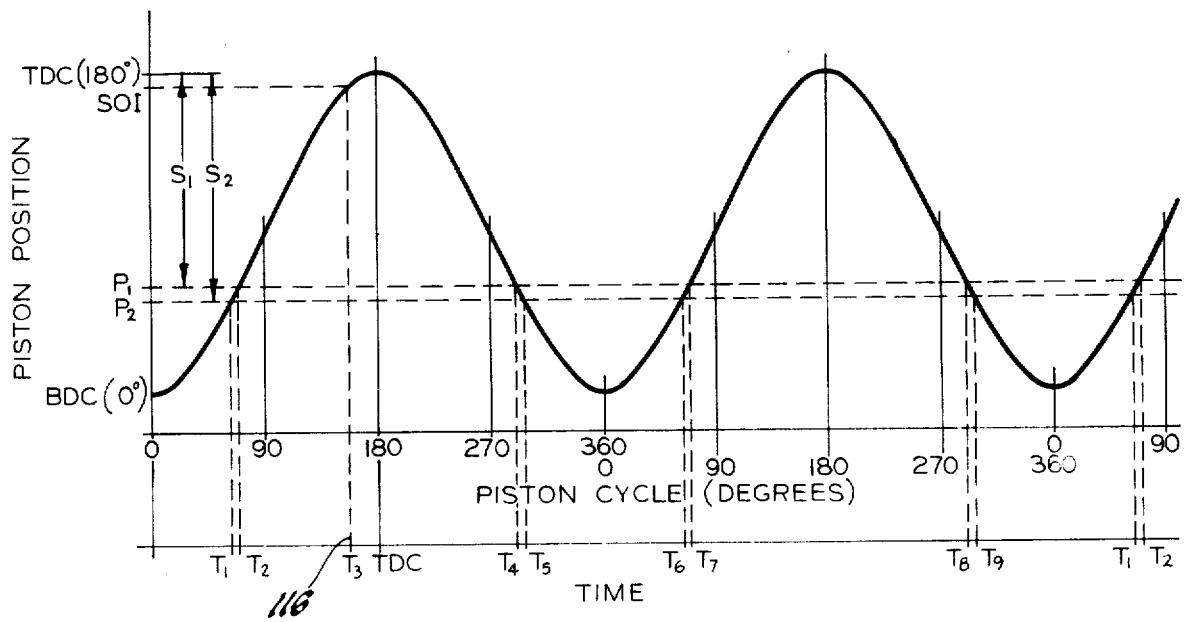
FIG. 5 is an idealized graph of piston position vs. time for engine operation at constant average speed.

FIG. 5 depicts the position of piston 10 as a function of time during engine operation at constant average speed. Additionally, the angular displacement of piston 10 in piston cycle degrees is shown on a horizontal axis. It will, of course, be recognized that the depicted piston position waveform has been idealized as a pure sine wave, and that the actual waveform contains a substantial amount of harmonic distortion. However, such distortion is symmetrical about top dead center. Hence, the time intervals to be differenced according to the teachings of this invention are equally affected by the positional distortion, and the resulting timing indication is insensitive to it. The points of interest on the piston position scale are top dead center (TDC), bottom dead center (BDC), start of fuel injection (SOI), and reference piston positions (P1 and P2) defined by the passage of piston vane 14 through sensor arms 30 and 32. On the time scale the time designations T1–T9 correspond to the occurrences of the reference piston positions P1 and P2, and start of injection (SOI), as indicated by the broken lines.

The exact relation to the pulses 72 and 72' with respect to piston movement will now be described with reference to FIGS. 4 and 5. As piston 10 approaches top dead center position (TDC) from its bottom dead center position (BDC), output line 82 of Schmitt trigger 70 is at a logic 1 voltage level corresponding to unaltered magnetic coupling, designated by reference numeral 60 in graph A of FIG. 4. At time T1 piston 10 reaches position P2 at which time the leading edge of vane 14 enters sensor air gap 34. At this point a period of altered magnetic coupling 62 is commenced and the voltage potential on line 82 falls to a logic zero level as indicated in graph C of FIG. 4 by reference numeral 74. At time T2 piston 10 reaches position P1 at which time the trailing edge of vane 14 leaves the air gap 34. At this point a period 60 of unaltered magnetic coupling is restored and the voltage on line 82 returns to a logic one level as designated by reference numeral 76. At time T3 the engine operation related event (SOI) occurs. For the example depicted in FIG. 5, SOI occurs about six degrees before TDC. At time TDC, piston 10 reaches the top dead center position and reverses its direction of travel. At time T4 piston 10 reaches position P1 at which time the leading edge of vane 14 enters air gap 34. At this point, a period of altered magnetic coupling 62 is resumed and the voltage on line 82 falls to a logic zero voltage level as indicated in graph C of FIG. 4 by reference numeral 78. At time T5, piston 10 reaches position P2 at which time the trailing edge of vane 14 leaves air gap 34. At this point, a period of unaltered magnetic coupling is restored and the voltage on line 82 rises to a logic one voltage level as designated by reference numeral 80.

In view of the above, it will be seen that falling edge 74 of pulse 72 and rising edge 80 of pulse 72' correspond to a single piston position P2. Similarly, rising edge 76 of pulse 72 and falling edge 78 of pulse 72' correspond to a single piston position P1. Thus, sensor pulse 72 is defined by times T1 and T2, and sensor pulse 72' is defined by times T4 and T5. Times T6–T9 define a second pair of sensor pulses 72 and 72' but such pulses occur in an exhaust/intake cycle, and there is no fuel injection or combustion.

According to the disclosed embodiment, the angular width of vane 14, and hence, the width of sensor pulses 72 and 72', is approximately eight piston cycle degrees. This dimension is not required by system design considerations and is variable depending on the clearance afforded by the piston and cylinder geometry.

Figure 6:
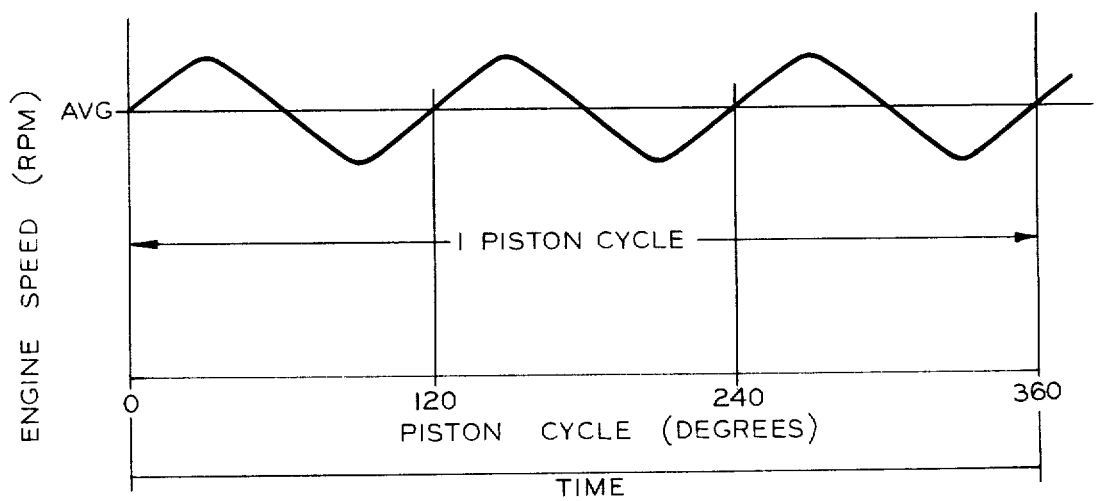
FIG. 6 is an idealized graph of engine speed vs. time illustrating speed variations due to isolated engine combustion events.

The distance between the top dead center position and pulses 72 and 72' is determined according to the placement of vane 14 and sensor 22. This distance is determined by system design considerations and is chosen so that the timing indication is insensitive to cyclic engine speed variations due to the isolated engine combustion events. Such speed variations are to be distinguished from changes in the average engine speed which are detected by the circuitry of this invention as will later be described. FIG. 6 depicts engine speed as a function of time for a six-cylinder internal combustion engine. As noted in reference to FIG. 5, the combustion events in four-stroke internal combustion engines occur in alternate piston cycles. Accordingly, there are three combustion events and therefore three cyclic engine speed variations per piston cycle in a six-cylinder, four-stroke engine. The speed variations occur in sequence and are depicted in FIG. 5 as an oscillatory speed component superimposed on the average engine speed (AVG). It will be recognized that such speed variations may induce some error in the timing indication since a small engine acceleration may be perceived by the control system even though the average engine speed remains constant. In this regard, the greatest such error would occur if the placement of sensor 22 and vane 14 were such that the distance between pulses 72 and 72' were 60 piston cycle degrees. In such case, the pulse 72 might occur in a speed oscillation valley while pulse 72' occurs in a speed oscillation peak, or vice versa.

This invention overcomes the above problem by recognizing that if sensor 22 and vane 14 are located so that the distance between pulses 72 and 72' is an integral multiple of 360/N piston cycle degrees—where N is the number of combustion events per piston cycle—the pulses 72 and 72' will occur in phase with the speed variations, and the various time intervals to be differenced according to the teachings of this invention will be equally affected thereby. As a result, the timing indication will be substantially insensitive to the speed variations. For a six-cylinder, four-stroke engine such as the one referred to in FIG. 6, the distance between sensor pulses 72 and 72' should thus be an integral multiple of 120 piston cycle degrees. Put somewhat differently, the distance S1 or S2 between top dead center and the reference piston positions P1 or P2 should be an integral multiple of 180/N piston cycle degrees. So long as (S2-S1) is small compared to S1 or S2, it is sufficient that either P1 or P2 be positioned an integral multiple of 180/N piston cycle degrees from top dead center.

For the purpose of discussion, it will hereinafter be assumed that the engine referred to is a six-cylinder, four-stroke internal combustion engine and that sensor 22 and vane 14 are positioned so that the distance S2 corresponds to 120 piston cycle degrees.

It will be appreciated that the angular distances defined above are unaffected by changes in engine speed and that the engine speed changes affect only the time occurrence of the pulses.

It will be recognized that the timing indication may thus be used in conjunction with a full-time or part-time closed loop control system for controlling the timing of the event. As previously noted, the event is typically the start of fuel injection for a diesel engine and spark for a gasoline engine. For convenience, however, this invention will be described primarily in the context of a diesel engine fuel injection system.

Figure 7:
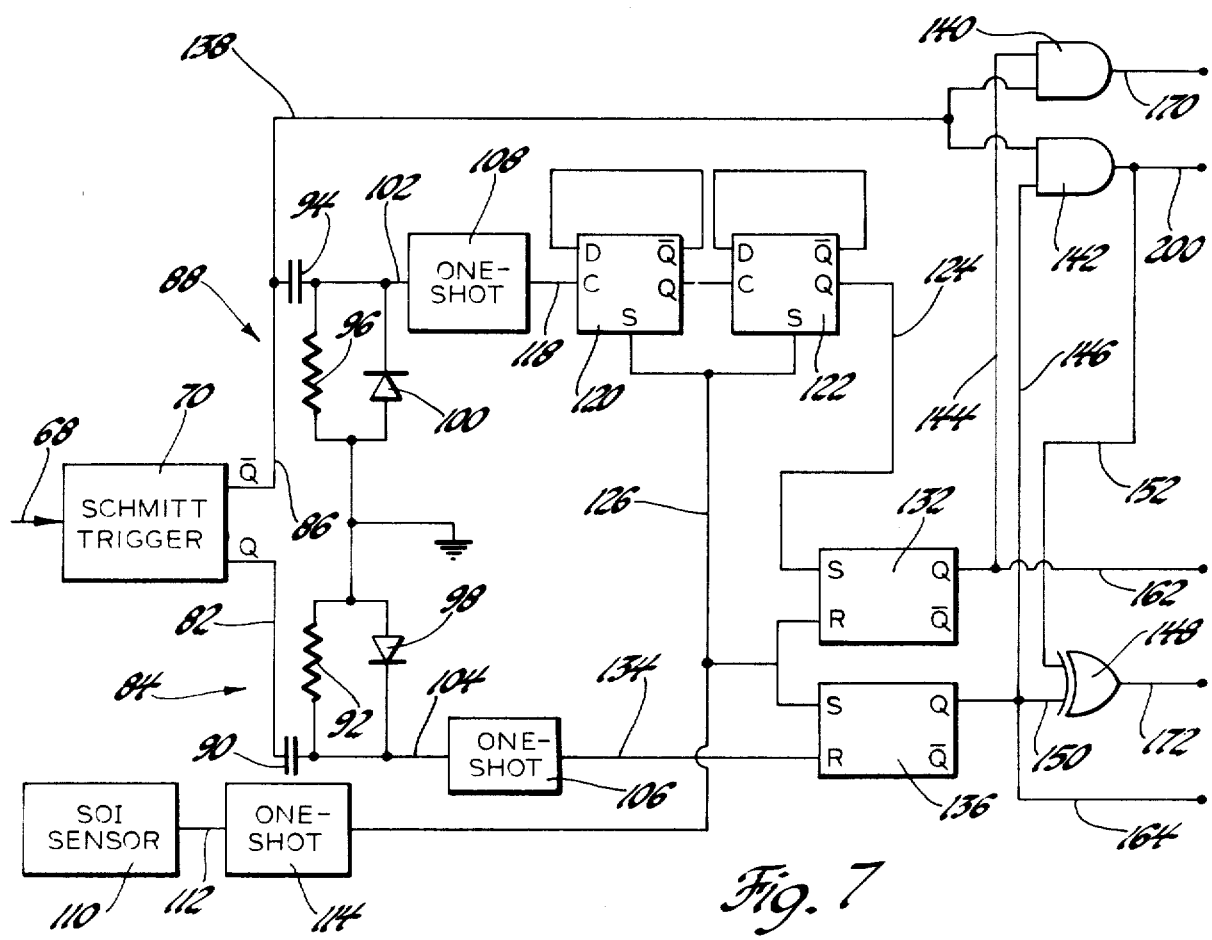
FIGS. 7 and 8 illustrate circuitry for implementing the timing system of this invention.
Figure 8:
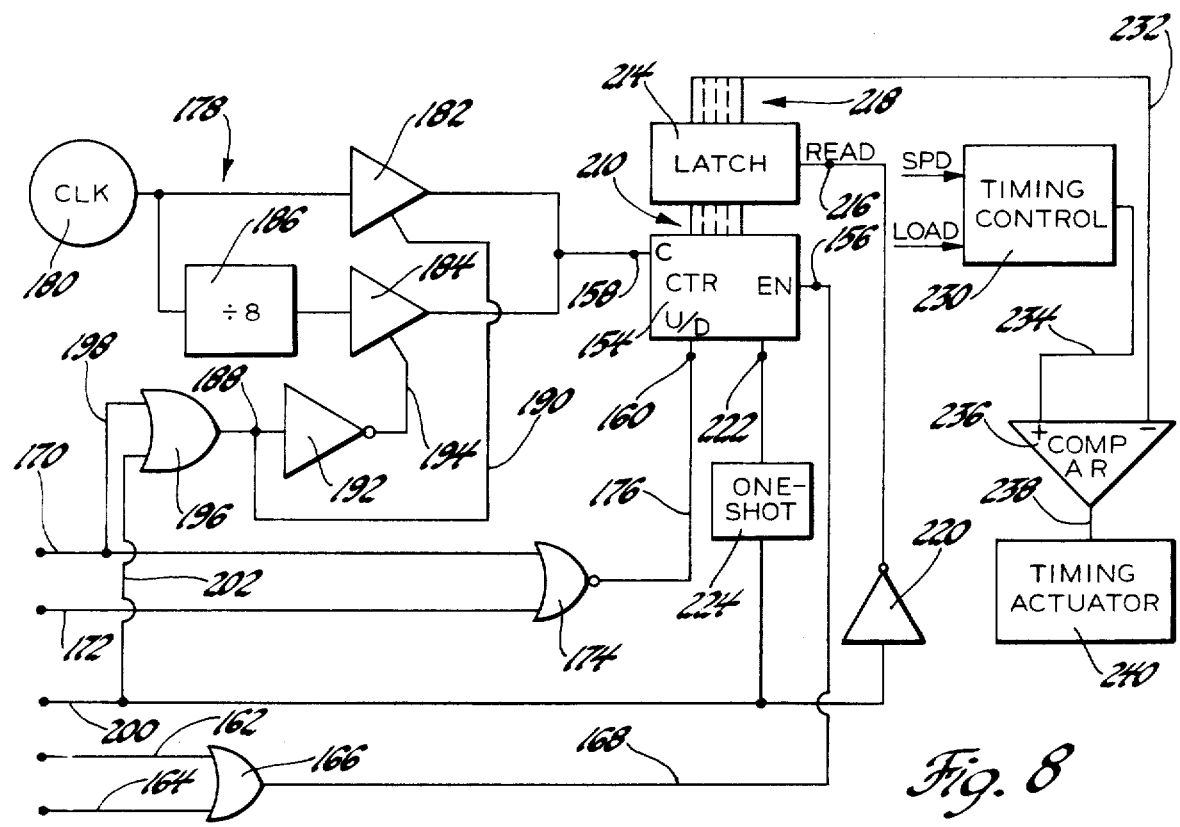

FIGS. 7 and 8 depict a discrete digital circuit for implementing this invention. As in FIG. 3, the pulses received from low pass filter 66 are applied as an input to Schmitt trigger 70 via line 68. Although not indicated in FIG. 3, Schmitt trigger 70 has both a normal or uninverted output Q which is depicted in graph C of FIG. 4, and an inverted output $\overline{Q}$. The Q output is connected via line 82 to a RC differentiator designated generally by reference numeral 84, and the $\overline{Q}$ output is connected via line 86 to an identical RC differentiator, designated generally by reference numeral 88. Specifically, differentiator 84 comprises capacitor 90 and resistor 92, and differentiator 88 comprises capacitor 94 and resistor 96. Differentiators 84 and 88 are conventional RC circuits which function to produce sharp positive or negative voltage pulses in response to rising or falling voltage transitions in an input signal. Diodes 98 and 100 cooperate with differentiators 84 and 88 respectively in a manner to suppress negative voltage pulses.

In view of the foregoing, it will be understood that the voltage pulses on line 104 correspond to the trailing edges 76 and 80 of sensor pulses 72 and 72' while the voltage pulses on line 102 correspond to the leading edges 74 and 78 of sensor pulses 72 and 72'. Lines 104 and 102 are connected as inputs to one-shots 106 and 108 respectively. One-shots 106 and 108 are conventional multivibrator devices and serve to produce clean, short duration pulses in response to trigger pulses such as the pulses appearing on lines 104 and 102.

Reference numeral 110 generally designates a sensor for detecting the initiation of an engine control event such as the start of fuel injection (SOI) in a diesel engine. Sensor 110 may be any of a number of suitable devices such as a pressure or Piezoelectric transducer placed in communication with the fuel injection line or fuel injector for cylinder 12. The output of sensor 110 is applied as an input via line 112 to one-shot 114 for producing sharp, short duration pulses corresponding to the start of injection SOI.

Figure 9:
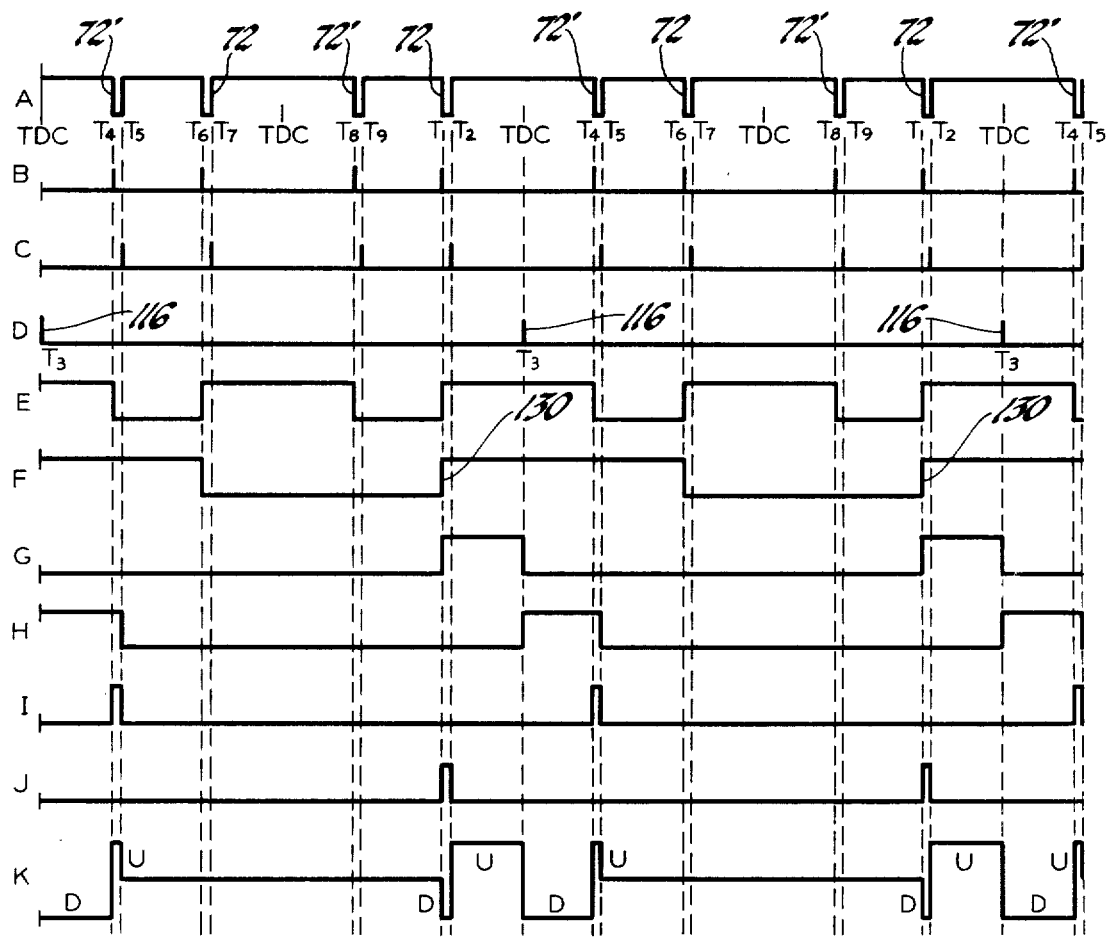
FIG. 9 is a graph depicting various idealized waveforms as a function of time for the circuit shown in FIGS. 7 and 8.

The above-described waveforms are depicted in FIG. 9, graphs A–D, as a function of time. Graph A depicts the sensor pulses 72 and 72' as they appear at the Q output of Schmitt trigger 70; graph B depicts the leading edge pulses at the output of one-shot 108; graph C depicts the trailing edge pulses at the output of one-shot 106; and graph D depicts the SOI pulses at the output of one-shot 114. As in FIG. 5, time designations T1–T9 correspond to the time occurrences of the various pulses and pulse edges in graphs A and D to more clearly illustrate the time relationships among the depicted waveforms. Since the engine is of the four-stroke type, SOI pulses 116 occur in alternate piston cycles, and for the operating conditions depicted in FIG. 9, it will be seen that SOI occurs at top dead center (TDC). As will be explained below, the sensor pulse edges corresponding to time designations T1, T2, T4 and T5 are detected and used in conjunction with SOI pulses 116 to determine the timing of SOI pulses 116 with respect to top dead center (TDC), such determination being insensitive to engine acceleration.

Referring now again to FIG. 7, the output of one-shot 108 is connected via line 118 to the clock input (C) of D-type flip-flop 120, the output Q of which is connected to the clock input (C) of D-type flip-flop 122. The $\overline{Q}$ outputs of flip-flops 120 and 122 are fed back to their data (D) inputs so that the flip-flops 120 and 122 form a Divide-By-Four logic circuit, the output of which appears on the Q output of flip-flop 122. The output of one-shot 114 is applied via line 126 to the set (S) inputs of flip-flops 120 and 122 so that the Divide-By-Four function is synchronized with SOI pulses 116. Such synchronization is necessary as a practical matter because the output states of flip-flops 120 and 122 are not determinable when power is initially applied to the circuit.

Referring again to FIG. 9, graphs E and F respectively depict the Q outputs of flip-flops 120 and 122, respectively. When the first SOI pulse 116 is received, both flip-flops 120 and 122 are set, and thereafter, the outputs change states according to the leading edge pulses depicted in graph B and appearing at the output of one-shot 108. It will thus be seen that a logic zero-to-logic one voltage transition at the Q output of flip-flop 122 (depicted in graph F of FIG. 9 by reference numeral 130) corresponds in time to the leading edge 74 of a pulse 72 preceding the top dead center position of piston 10.

The Q output of flip-flop 122 is applied via line 124 to the set (S) input of RS flip-flop 132 and the output of one-shot 106 is applied via line 134 to the reset (R) input of RS flip-flop 136. The SOI pulses 116 on line 126 are applied to the reset input (R) of flip-flop 132 and to the set input (S) of flip-flop 136. Graphs G and H of FIG. 9 depict and Q outputs of flip-flops 132 and 136, respectively. As may be seen in graph G, the Q output of flip-flop 132 is set on the leading edge 74 of a sensor pulse 72 and is reset by an SOI pulse 116. As may be seen in graph H, the Q output of flip-flop 136 is set by an SOI pulse 116 and is reset by the trailing edge 80 of a pulse 72'.

The $\overline{Q}$ output of Schmitt trigger 70 is connected via lines 86 and 138 as an input to both AND gates 140 and 142. The Q output of flip-flop 132 is connected via line 144 as an input to AND gate 140 and the Q output of flip-flop 136 is connected via line 146 as an input to AND gate 142. The outputs of AND gates 142 and 140 are depicted in graphs I and J of FIG. 9 as a function of time. As may be seen in graph J, the output of AND gate 140 assumes a logic one voltage level only during a pulse 72; and as may be seen in graph I, the output of AND gate 142 assumes a logic one voltage level only during a pulse 72'.

Exclusive OR gate 148 has one input connected to the Q output of flip-flop 136 via line 150 and the other input connected to the output of AND gate 142 via line 152 so that its output assumes a logic one voltage level between an SOI pulse 116 and the leading edge 78 of a pulse 72'.

It will be appreciated that the circuitry illustrated in FIG. 7 thus functions to decode sensor pulses 72 and 72', and to provide digital timing signals corresponding to the time intervals used in the determination of the timing of start of injection relative to top dead center, as described above. Circuit lines 162, 164, 170, 172 and 200 are connected to the circuitry shown in FIG. 8 as indicated.

Referring now to FIG. 8, counter 154 is a conventional digital device adapted when enabled by a logic one voltage potential at enable terminal 156 (EN) to receive clock pulses at clock terminal 158 (C) for incrementing or decrementing the count stored in its output register according to the logic voltage level applied to up/down terminal 160 (U/D). A logic one voltage potential at terminal 160 causes clock pulses applied to terminal 158 to increment the count in the output register while a logic zero at terminal 160 causes clock pulses applied to terminal 158 to decrement the count in the output register.

The Q outputs of flip-flops 132 and 136 are applied via lines 162 and 164 as inputs to OR gate 166, the output of which is connected via line 168 to counter enable terminal 156. Accordingly, counter 154 is enabled to receive clock pulses at clock terminal 158 in the time interval between a leading edge 74 of a sensor pulse 72 and a trailing edge 80 of a sensor pulse 72'.

The output of AND gate 140 and exclusive OR gate 148 are connected as inputs via lines 170 and 172 to NOR gate 174, the output of which is connected via line 176 to U/D terminal 160 of counter 154 for controlling the counting direction. As a result, counter 154 is enabled to accumulate clock pulses in a positive sense (incrementing) in the time interval during a sensor pulse 72', and in the time interval between a trailing edge 76 of a sensor pulse 72 and start of injection. Also, counter 154 is enabled to accumulate clock pulses in a negative sense (decrementing) in the time interval between start of injection and a leading edge 78 of a sensor pulse 72', and in the time interval during a sensor pulse 72. This relationship is depicted schematically in graph K of FIG. 9 wherein time intervals designated U indicate that the counter 154 is enabled to count up or in a positive sense and wherein time intervals designated D indicate that the counter 154 is enabled to count down or in a negative sense.

Reference numeral 178 generally designates circuitry for controlling the clock pulse frequency applied to counter 154. Tristate buffers 182 and 184 establish alternate paths by which clock pulses from clock 180 are applied to the clock input terminal 158 of counter 154. As will be well known to those skilled in the art, Tristate butfers 182 and 184 act as gates which, when enabled pass a signal unaltered from input to output and when disabled present a high impedance or essentially open circuit output. When buffer 182 is enabled, the output of clock 180 is connected directly to clock input terminal 158. When buffer 184 is enabled, the output of clock 180 is connected to clock input terminal 158 through Divide-By-Eight circuit 186. Divide-By-Eight circuit 186 may be a standard digital device similar to the Divide-By-Four circuit described above and comprising three D-type flip-flops. The output frequency of such a circuit is one-eighth the frequency of the input. Buffers 182 and 184 are alternately enabled according to the logic voltage level at terminal 188. If terminal 188 is at a logic one voltage level potential, buffer 182 is enabled via line 190, and buffer 184 is disabled through inverter 192 via line 194. If terminal 188 is at a logic zero voltage potential, buffer 184 is enabled through inverter 192 and buffer 182 is disabled via line 190.

The voltage at terminal 188 is determined according to the output state of OR gate 196, the input terminals of which are connected to the output of AND gate 140 via lines 170 and 198 to the output of AND gate 142 via lines 200 and 202. In the time intervals during pulses 72 and 72', the output of OR gate 196 is thereby at a logic one voltage level enabling buffer 182 to pass clock pulses directly from clock 180 to clock input terminal 158 of counter 154. Otherwise, clock pulses from the output of Divide-By-Eight circuit 186 are applied to clock input 158. Thus, counter 154 accumulates clock pulses eight times faster during pulses 72 and 72' than during the time intervals between pulses 72 and 72'. The reason for the different counting rates is discussed below in reference to FIG. 11.

The counter output lines for accessing the counter output register are designated generally by reference numeral 210 and are connected as an input to latch circuit 214. Latch 214 may be any digital circuit effective when enabled by a logic zero-to-logic one voltage transition at READ input terminal 216 to store the contents of the counter output register and to make the stored data accessible on its output register, which is designated generally by reference numeral 218.

Inverter 220 is connected between the output terminal of AND gate 142 and READ terminal 216 and provides a logic zero-to-logic one voltage transition on READ terminal 216 at the trailing edge 80 of a pulse 72'. The output of AND gate 140 is applied to the reset (R) terminal 222 of counter 154 through one-shot 224 for resetting the output register of counter 154. One-shot 224 provides a short time delay and counter 154 is thus reset shortly after latch 214 reads the contents of the counter output register.

Reference numeral 230 designates a function generator such as a look-up table for generating a digital number indicative of the desired fuel injection timing relative to top dead center as a function of speed and load inputs. It will be appreciated that the speed and load input signals may be obtained in any suitable manner such as with conventional magnetic or pressure transducers. The output lines 218 of latch 214 and the output of function generator 230 are applied as inputs via lines 232 and 234 (shown as single lines) to comparator 236 for generating an error signal on line 238 which indicates the difference between the actual and desired timing of the fuel injection control event. Line 238 is connected to a suitable timing actuator 240 for adjusting the timing of the start of injection to reduce the error signal on line 238 to zero.

In lieu of comparator 236, a desired timing number such as the one developed by function generator 230, may be preset into counter 154 prior to the generation of sensor pulse 72. In this way, the net count in counter 154 would directly indicate the timing error. In either case, the timing number must be representative of time as opposed to a particular advance angle since the counter operates on a time basis, while a given angular timing relationship corresponds to different absolute times as a function of engine speed.

It will be understood in reference to the above discussion that function generator 230, comparator 236, and timing actuator 240 do not form a part of this invention but are shown merely to illustrate the usefulness of this invention in a fuel injection control system.

In view of the foregoing, it will be understood in reference to FIGS. 7 and 8, that the operation of counter 154 is controlled in a manner to sense the difference between corresponding time intervals on opposite sides of the engine control event. More particularly, counter 154 counts in a positive direction in an interval between trailing edge 76 of a sensor pulse 72 and start of injection, and in a negative direction in an interval between start of injection and the leading edge 78 of a pulse 72'. The net count over the above-mentioned intervals is thus determined according to the difference in time between the two intervals. If the engine is rotating at constant speed, and if start of injection occurs at top dead center, the two timed intervals are equal and the net count determined over the two intervals is zero. If start of injection deviates from top dead center, the net count is indicative of the time difference between top dead center and start of injection. Specifically, the sense of the count indicates whether SOI is advanced or retarded with respect to top dead center and the magnitude of the count indicates the time duration by which SOI is advanced or retarded.

Similarly, the counter 154 counts in opposite directions during sensor pulses 72 and 72' so that the net count due to the pulses is determined by the difference in time duration of the pulses. If the engine is rotating at constant speed, the net count for the pulses 72 and 72' is zero. If the engine is accelerating or decelerating, the pulse durations are not equal and the net count due to the pulses is proportional in magnitude to the acceleration rate. The sign of the net count indicates whether the acceleration is positive or negative.

Thus, the total count in counter 154 which is transferred to latch circuit 214 at the trailing edge 80 of a sensor pulse 72', is determined according to the two net counts described above. The net count due to the difference between the time interval between the trailing edge 76 of pulse 72 and start of injection and the time interval between start of injection and the leading edge 78 of pulse 72' makes the total count proportional to the time difference between start of injection and top dead center, and the net count due to the difference in duration of pulses 72 and 72' compensates the total count for engine acceleration.

Figure 10:
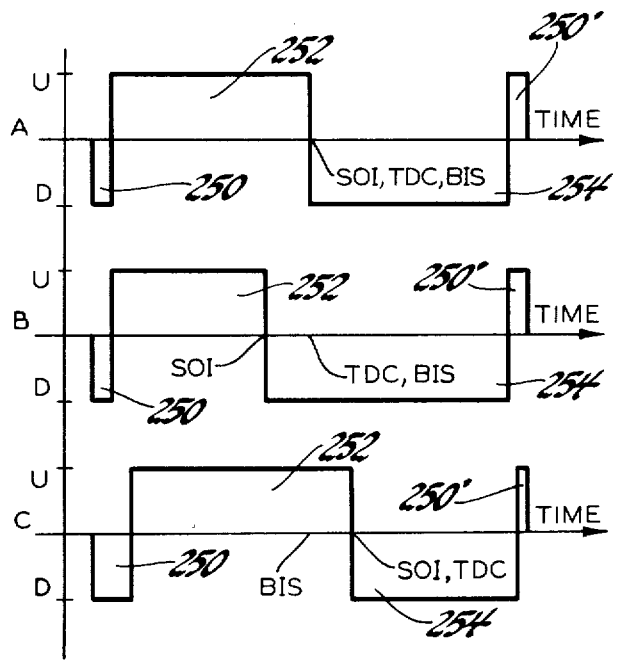
FIG. 10 is a graph depicting the system operation as a function of time under various engine conditions.

The time based graphs in FIG. 10 illustrate the counter operation under the various engine operating conditions referred to above. Graph A is similar to graph K of FIG. 9 wherein the engine is running at constant average speed and start of injection occurs at top dead center. Graph B depicts counter operation under constant average engine speed, but wherein start of injection is advanced with respect to top dead center. Graph C depicts counter operation under engine acceleration wherein start of injection occurs at top dead center. In each case, the areas above the time axis represent periods for which counter 154 is enabled to count up (U), while areas below the time axis represent periods for which 154 is enabled to count down (D). On the time axis, start of injection is designated by SOI, top dead center is designated by TDC, and the time bisector of pulses 72 and 72' is designated by BIS. Areas 250 and 250' correspond in duration to the width of sensor pulses 72 and 72'.

Referring now more particularly to graph A, it will be seen that SOI, TDC, and BIS occur at the same time. Thus, the duration of area 252 is equal to that of 254. Since the average engine speed is constant, areas 250 and 250' are also equal in duration. Accordingly, the total count at the trailing edge 80 of a sensor pulse 72' is zero, indicating that start of injection occurred at top dead center.

In FIG. B, TDC and BIS occur at the same time but SOI is advanced several degrees before top dead center. Accordingly, the duration of area 252 is shorter than that of area 254. Since engine speed is constant, areas 250 and 250' are of equal duration. The total count at the trailing edge 80 of a sensor pulse 72' is non-zero and negative in sign. The magnitude of the count indicates the time between start of injection and top dead center while the negative sign indicates that start of injection is advanced with respect to top dead center. If start of injection were retarded with respect to top dead center, the duration of area 252 would exceed that of area 254, yielding a total count of corresponding magnitude and positive sign.

In FIG. C, SOI and TDC occur at the same time, but due to engine acceleration, SOI and TDC occur some time after BIS. Accordingly, the duration of area 252 exceeds that of area 254 even though start of injection occurs at top dead center. Moreover, the engine acceleration causes the duration of area 250 to exceed that of area 250'. If the total count were determined only by the net count due to areas 252 and 254, then acceleration induced error would result. However, when the difference in duration of areas 250 and 250' is properly taken into account, the count is compensated for the acceleration induced error so that at the trailing edge 80 of a sensor pulse 72', the total count is zero, indicating that start of injection occurred at top dead center.

Since the duration of areas 250 and 250' are short compared to the duration of areas 252 and 254, the time difference induced by acceleration tends to be smaller for areas 250 and 250' than for areas 252 and 254. Thus, the time difference of areas 250 and 250' must be exaggerated or magnified in order to properly compensate the total count for the acceleration induced time difference of areas 252 and 254. In this regard, it has been found that the factor by which the time difference must be magnified is proportional to the angular ratio of S2/(S2-S1) where S1 is the angular dimension between reference piston position P1 and top dead center, and S2 is the angular dimension between reference piston position P2 and top dead center.

Figure 11:
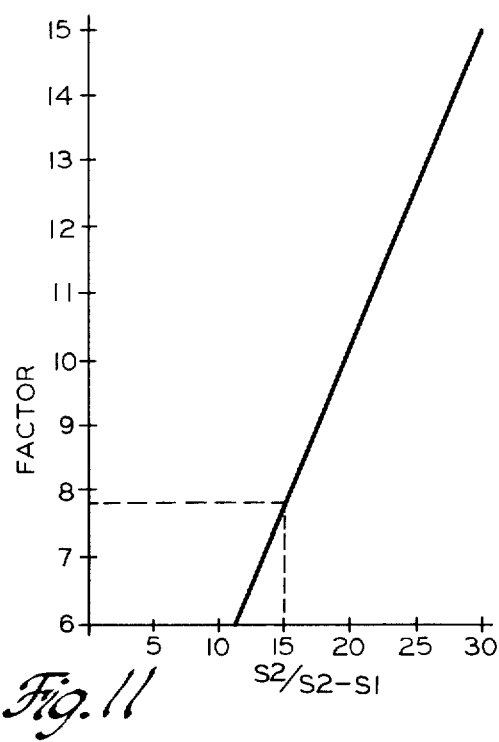
FIG. 11 is a graph depicting the value of the magnification factor as a function of a defined dimension ratio.

The above-described relationship is theoretically determined based on constant engine acceleration between pulses 72 and 72', and is depicted in FIG. 11. The vertical axis represents the factor by which the time duration difference of areas 250 and 250' must be exaggerated, and the horizontal axis represents the angular ratio of S2/(S2-S1). The magnification factor is thus substantially equal to S2/2(S2-S1). For the illustrated embodiment wherein S2 is 120° and wherein S2-S1 is 8°, the angular ratio is equal to 15, and the time duration difference of areas 250 and 250' must be exaggerated by a factor of approximately 8. Thus, in FIG. 8 clock pulses from clock 180 are passed through Divide-By-Eight circuit 186 before application to the clock terminal 158 of counter 154 for times after sensor pulse 72 and before sensor pulse 72'. In this way, the count in counter 154 is accumulated eight times faster during sensor pulses 72 and 72' than during the remainder of the counting period, and the count read by latch 214 at the trailing edge 80 of sensor pulse 72' is properly compensated for engine acceleration.

It will be understood by those skilled in the art of engine design that the wrist pin 13 may be slightly offset from the centerline of the cylinder 12 in order to prevent a condition known as piston slap, wherein the piston abruptly moves from one cylinder sidewall to the other at or near the top of its stroke. In such case, top dead center does not occur at the midpoint of the sensor pulses but is slightly offset to one side. Since the timing indication disclosed herein is based on the presumption that the sensor pulses are symmetrically spaced about the dead center position, there will be a slight error or offset in the timing indication when the method of this invention is applied to engines having the wrist pin offset. However, such offset or error is determinable as a function of the connecting rod length, the wrist pin offset distance, and the piston stroke. Since the error is constant for a particular engine design, it may be accounted for by the system electronics at a suitable point, such as in function generator 230.

Although this invention has been described in reference to specific embodiments, it will be recognized that various modifications may occur to those skilled in the art. For example, the sensor for producing pulses 72 and 72' may be modified to include different sensing elements or the location of the sensor may be modified so that the pulses are produced in response to the movement of a piston-related member, such as a connecting rod or valve rocker arm. In this regard, it will be understood that such modifications may be within the scope of this invention which is limited only by the appended claims.

The embodiments of the invention in which an exclusive property or privilege is claimed are defined as follows:

1. In an internal combustion engine, apparatus for timing the occurrence of an engine operation related event in respect to the top or bottom dead center position of the piston, comprising:
    means for defining a pair of time intervals extending between the occurrence of the engine operation related event and the passage of the piston through a reference position before the event as the piston moves toward the dead center position and after the event as the piston moves away from the dead center position, respectively; and
    means for utilizing the difference in duration between the pair of time intervals as an indication of the time relationship between the occurrence of the engine operation related event and the arrival of the piston at the dead center position, the sense of the difference indicating whether the event occurred before or after the arrival of the piston at the dead center position and the magnitude of the difference indicating the time difference between the occurrence of the event and the arrival of the piston at the dead center position.

2. In an internal combustion engine:
    means for timing the occurrence of an engine operation related event in respect to the top or bottom dead center positions of a piston based upon the time relationship between the occurrence of the event and the passage of the piston through a reference position before the event as the piston moves toward the dead center position and after the event as the piston moves away from the dead center position, respectively; and
    means for compensating the foregoing timing for error due to engine acceleration, based upon the difference in the elapsed times between the passage of the piston through a pair of reference positions as the piston moves toward and away from the dead center position, respectively.

3. In an internal combustion engine including a piston which cyclically reciprocates between top and bottom dead center positions in synchronization with the speed of the engine, timing apparatus comprising:
    means for defining a first pair of time intervals between the occurrence of an engine operation related event and the passage of the piston through a reference position before the event as the piston moves toward a dead center position and after the event as the piston moves away from the dead center position, respectively;
    means for employing the difference between the first pair of time intervals as an indication of the time relationship between the occurrence of the engine operation related event and the occurrence of the piston at the dead center position;
    means for defining a second pair of time intervals between the passage of the piston through a pair of reference positions as the piston moves toward and away from the dead center position, respectively; and
    means for employing the difference between the second pair of time intervals as an indication of the acceleration of the engine to compensate the time relationship indication for error due to engine acceleration.

4. In an internal combustion engine including a piston which cyclically reciprocates between top and bottom dead center positions in synchronization with the speed of the engine, apparatus for timing the occurrence of an engine operation related event in respect to the occurrence of the piston at one of the dead center positions, comprising:
    means for defining a first pair of time intervals between the occurrence of the engine operation related event and the passage of the piston through a reference position before the event as the piston moves toward a dead center position and after the event as the piston moves away from the dead center position, respectively, and for defining a second pair of time intervals between the passage of the piston through a pair of reference positions as the piston moves toward and away from the dead center position, respectively;
    means for developing a timing signal having a value which is a function of the difference between the first pair of time intervals and the difference between the second pair of time intervals such that the timing value is indicative of the time relationship between the occurrence of the engine related event and the occurrence of the piston at the dead center position and is substantially compensated for error due to engine acceleration; and
    means for spacing the reference positions of the piston from the dead center position by substantially an integral multiple of 180/N piston cycle degrees where N is the number of isolated engine combustion events occurring per piston cycle such that engine speed variations caused by such combustion events have substantially equal effect on both time intervals in each time interval pair thereby causing such effects to be substantially cancelled out when the time intervals are differenced in the development of the timing signal.

5. In an internal combustion engine including a piston which cyclically reciprocates between top and bottom dead center positions in synchronization with the speed of the engine, apparatus for timing the occurrence of an engine operation related event in respect to the passage of the piston through one of the dead center positions, comprising:
    means for defining a first pair of time intervals between the occurrence of the engine operation related event and the passage of the piston through a reference position before the event as the piston moves toward a dead center position and after the event as the piston moves away from the dead center position, respectively, and for defining a second pair of time intervals between the passage of the piston through a pair of reference positions as the piston moves toward and away from the dead center position, respectively; and means for developing a timing signal which varies from an initial value to a final value over the first and second pairs of time intervals, the timing signal increasing during one interval and decreasing during the other interval in each pair and varying at one rate during one pair of intervals and at another rate during the other pair of intervals, such that the final value of the timing signal is indicative of the time relationship between the occurrence of the engine operation related event and the passage of the piston through the dead center position and is substantially compensated for error due to engine acceleration.

6. In an internal combustion engine including a piston which cyclically reciprocates between top and bottom dead center positions in synchronization with the speed of the engine, apparatus for timing the occurrence of an engine operation related event in respect to the passage of the piston through one of the dead center positions, comprising:

means for defining first and second reference positions P1 and P2 of the piston spaced from the dead center position by S1 and S2 piston cycle degrees, respectively, where S2 is greater than S1;

means for defining a first pair of time intervals between the occurrence of the engine operation related event and the passage of the piston through the first reference position P1 before the event as the piston moves toward a dead center position and after the event as the piston moves away from the dead center position, respectively, and for defining a second pair of time intervals between the passage of the piston through the first and second reference positions P1 and P2 as the piston moves toward and away from the dead center position, respectively, and means for developing a timing signal having a value which is a function of the difference between the first pair of time intervals and the difference between the second pair of time intervals where the effect of the latter difference is magnified in relation to the effect of the former difference by a factor proportional to S2/(S2−S1) such that the timing signal value is indicative of the time relationship between the occurrence of the engine related event and the passage of the piston through the dead center position and is substantially compensated for error due to engine acceleration.

7. In an internal combustion engine including a piston which cyclically reciprocates between top and bottom dead center positions in synchronization with the speed of the engine, apparatus for timing the occurrence of an engine operation related event in respect to the passage of the piston through one of the dead center positions, comprising:

means for defining first and second reference positions P1 and P2 of the piston spaced from the dead center position by S1 and S2 piston cycle degrees, respectively, where S2 is greater than S1;

means for defining a first pair of time intervals between the occurrence of the engine operation related event and the passage of the piston through the first reference position before the event as the piston moves toward the dead center position and after the event as the piston moves away from the dead center position, respectively, and for defining a second pair of time intervals between the passage of the piston through the first and second reference positions as the piston moves toward and away from the dead center position, respectively, and means including a clock generator for providing clock pulses at first and second frequencies F1 and F2, respectively, and an up/down counter for counting the clock pulses in a counting cycle extending over the first and second pairs of intervals to derive a timing signal which varies from an initial value to a final value at the end of the counting cycle, the up/down counter operating to count up during one interval and down during the other interval in each pair of intervals, and the clock pulse generator operating to provide clock pulses at frequency F1 during the first pair of time intervals and at frequency F2 during the second pair of time intervals, where the ratio F2/F1 is proportional to S2/(S2−S1) such that the final value of the timing signal is indicative of the time relationship between the occurrence of the engine related event and the passage of the piston through the dead center position and is substantially compensated for error due to engine acceleration.

8. In an internal combustion engine:

means for timing the occurrence of an engine operation related event in respect to the top or bottom dead center positions of a piston based upon the time relationship between the occurrence of the event and the midpoint of an interval defined by the passage of the piston through a reference position as the piston moves toward the dead center position and as the piston moves away from the dead center position, respectively; and means for compensating the foregoing timing for error due to engine acceleration, based upon the difference in the elapsed times between the passage of the piston through a pair of reference positions as the piston moves toward and away from the dead center position, respectively.

* * * * *